(12) United States Patent
Xiao et al.

(10) Patent No.: US 9,787,445 B2
(45) Date of Patent: *Oct. 10, 2017

(54) SYSTEM AND METHOD FOR INTER-CELL INTERFERENCE COORDINATION

(71) Applicant: Futurewei Technologies, Inc., Plano, TX (US)

(72) Inventors: Weimin Xiao, Hoffman Estates, IL (US); Oghenekome Oteri, San Diego, CA (US); Cornelius Dawid Janse van Rensburg, Wylie, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 294 days.

This patent is subject to a terminal disclaimer.

(21) Appl. No.: 14/502,150

(22) Filed: Sep. 30, 2014

(65) Prior Publication Data

US 2015/0016411 A1    Jan. 15, 2015

Related U.S. Application Data

(62) Division of application No. 12/705,107, filed on Feb. 12, 2010, now Pat. No. 9,031,032.

(Continued)

(51) Int. Cl.
*H04L 5/00* (2006.01)
*H04W 52/24* (2009.01)
(Continued)

(52) U.S. Cl.
CPC .......... *H04L 5/0032* (2013.01); *H04L 1/0003* (2013.01); *H04L 1/0009* (2013.01);
(Continued)

(58) Field of Classification Search
CPC ....... H04L 5/0032; H04L 1/0026; H04L 1/06; H04L 1/0003; H04L 1/0009;
(Continued)

(56) References Cited

U.S. PATENT DOCUMENTS

| 2005/0128141 A1 | 6/2005 | Howell |
| 2006/0209721 A1 | 9/2006 | Mese et al. |

(Continued)

FOREIGN PATENT DOCUMENTS

| CN | 1658526 A | 8/2005 |
| CN | 1882154 A | 12/2006 |

(Continued)

OTHER PUBLICATIONS

LTE, "3rd Generation Partnership Project; Technical Specification Group Radio Access Network; Further Advancements for E-UTRA Physical Layer Aspects (Release 9)," 3GPP TR 36.814 v1.5.0, Nov. 2009, 53 pages.

(Continued)

*Primary Examiner* — Marcos Torres
(74) *Attorney, Agent, or Firm* — Futurewei Technologies, Inc.

(57) ABSTRACT

A system and method for inter-cell interference coordination is provided. A method for controller operation includes receiving interferer information from a device served by the controller, scheduling a cell edge device based on the received interferer information, and reporting usage information of the subset of resources to neighboring controllers. The cell edge device operates in a periphery of a coverage area of the controller, and the cell edge device is scheduled to a subset of resources. The method also includes from each neighboring controller, receiving neighboring usage information of a neighboring subset of resources reserved for cell edge devices served by the neighboring controller. The method further includes scheduling a cell center device based on the received usage information from the neighboring controllers, and transmitting to scheduled devices over their respective scheduled resources. Cell center device is scheduled to resources not in the subset of resources.

20 Claims, 4 Drawing Sheets

US 9,787,445 B2
Page 2

Related U.S. Application Data

(60) Provisional application No. 61/248,524, filed on Oct. 5, 2009.

(51) Int. Cl.

| | | |
|---|---|---|
| *H04W 72/12* | (2009.01) | |
| *H04L 1/00* | (2006.01) | |
| *H04L 1/06* | (2006.01) | |
| *H04W 48/08* | (2009.01) | |
| *H04W 48/16* | (2009.01) | |
| *H04W 52/28* | (2009.01) | |
| *H04W 92/22* | (2009.01) | |
| *H04W 72/00* | (2009.01) | |
| *H04W 92/20* | (2009.01) | |

(52) U.S. Cl.
CPC .............. *H04L 1/0026* (2013.01); *H04L 1/06* (2013.01); *H04W 52/243* (2013.01); *H04W 72/1205* (2013.01); *H04W 48/08* (2013.01); *H04W 48/16* (2013.01); *H04W 52/283* (2013.01); *H04W 72/00* (2013.01); *H04W 72/1226* (2013.01); *H04W 92/20* (2013.01); *H04W 92/22* (2013.01)

(58) Field of Classification Search
CPC ........... H04W 52/243; H04W 72/1205; H04W 72/00; H04W 92/20; H04W 72/1226; H04W 48/08; H04W 48/06; H04W 52/283; H04W 92/22
See application file for complete search history.

(56) References Cited

U.S. PATENT DOCUMENTS

| | | | |
|---|---|---|---|
| 2007/0004423 | A1 | 1/2007 | Gerlach et al. |
| 2008/0207135 | A1* | 8/2008 | Varadarajan .......... H04L 1/0029 455/69 |
| 2009/0003266 | A1 | 1/2009 | Stolyar et al. |
| 2009/0034427 | A1 | 2/2009 | Sohn et al. |
| 2009/0170497 | A1 | 7/2009 | Miao et al. |
| 2009/0280747 | A1* | 11/2009 | Sudarshan .......... H04L 25/0204 455/63.1 |
| 2010/0033374 | A1 | 2/2010 | van Rensburg et al. |
| 2010/0130223 | A1 | 5/2010 | Liao et al. |
| 2010/0317339 | A1* | 12/2010 | Koc ...................... H04L 5/0007 455/424 |

FOREIGN PATENT DOCUMENTS

| | | |
|---|---|---|
| CN | 101064865 A | 10/2007 |
| GB | 2285900 A | 7/1995 |
| WO | 2009005682 A1 | 1/2009 |
| WO | 2009099076 A1 | 8/2009 |

OTHER PUBLICATIONS

Alcatel-Lucent, "UE PMI feedback signalling for user pairing/coordination," 3GPP TSG RAN WG1 #55 Meeting, R1-084141, Nov. 10-14, 2008, pp. 1-3, Prague, Czech Republic.
Chae, C-B, et al., "Coordinated Beamforming with Limited Feedback in the MIMO Broadcast Channel," IEEE JSAC, Oct. 2008, pp. 1-11
Chae, C-B, et al., "Network Coordinated Beamforming for Cell-Boundary Users: Linear and Nonlinear Approaches," IEEE Journal of Selected Topics in Signal Processing, vol. 3, No. 6, Dec. 2009, pp. 1094-1105.
Chinese Report received in Application No. 2010800389518, mailed Jul. 10, 2013, 2 pages.
Ericsson, ST-Ericsson, "LTE Rel8/10 Performance and IMT-Advanced Requirements," 3GPP TSG RAN WG1 Meeting #57bis, R1-092739, Jun. 29-Jul. 3, 2009, 11 pages, Los Angeles, Ca.
Extended European Search Report received in Application No. 10821590.6, Applicant: Huawei Technologies Co., Ltd., mailed Sep. 4, 2012, 7 pages.
First Office Action with partial English translation received in Chinese Application No. 201080038951.8, mailed Jul. 16, 2013, 24 pages.
Hitachi, Ltd., "Interference Management for Broadband Transmission with Antenna Port 5," 3GPP TSG RAN WG1 #55bis, R1-090068, Jan. 12-16, 2009, pp. 1-3, Ljubljana, Slovenia.
Huawei, "Performance of DL Coordinated Beam Switching Under Varying Traffic Loads," 3GPP TSG RAN WG1 meeting #57, R1-091797, May 4-8, 2009, 9 pages, San Francisco, CA.
Huawei, "Some Results on DL Coordinated Beam Switching for Interference Management in LTE-Advanced," 3GPP TSG RAN WG1#55, R1-084352, Nov. 10-14, 2008, 7 pages, Prague, Czech Republic.
Huawei, "Signalling Aspects and TP on DL CoMP for LTE-Advanced," 3GPP TSG RAN WG1 meeting #56, R1-090818, Feb. 9-13, 2009, 3 pages, Athens, Greece.
Huawei, "Performance of DL Coordinated Beam Switching with Bursty Traffic," 3GPP TSG RAN WG1 meeting #57bis, Huawei, R1-092365, Jun. 29-Jul. 3, 2009, 8 pages, Los Angeles, CA.
Huawei, "CoMP Coordinated Scheduling for LTE-Advanced," 3GPP TSG RAN WG1 meeting #56bis, R1-091263, Mar. 23-27, 2009, 7 pages, Seoul, Republic of Korea.
International Search Report and Written Opinion received in Patent Cooperation Treaty Application No. PCT/CN2010/077484, mailed Jan. 6, 2011, 10 pages.
Zhang, H., et al., "Asynchronous Interference Mitigation in Cooperative Base Station Systems," IEEE Transactions on Wireless Communications, vol. 7, No. 1, Jan. 2008, pp. 155-165.
Mitsubishi Electric, "Leakage-based Precoding for CoMP in LTE-A," 3GPP RAN1#55b, R1-090028, Jan. 12-16, 2009, pp. 1-13, Ljubljana, Slovenia.
Motorola, "Spatial Correlation Feedback to Support LTE-A MU-MIMO and CoMP: System Operation and Performance Results," TSG-RAN WG1 #57, R1-091936, May 4-8, 2009, pp. 1-9, San Francisco CA.
Motorola, "CoMP Operation and Evaluation," TSG-RAN WG1 #57, R1-091935, May 4-8, 2009, pp. 1-5, San Francisco, CA.
Motorola, "DL Passive Open Loop CoMP and Performance" 3GPP TSG RAN1 #57bis, R1-092603, Jun. 29-Jul. 3, 2009, pp. 1-4, Los Angeles, CA.
Motorola, "CoMP Operation Based on Spatial Covariance Feedback and Performance Results of Coordinated SU/MU Beamforming," 3GPP TSG RAN1#57bis, R1-092634, Jun. 29-Jul. 3, 2009, pp. 1-10, Los Angeles, CA.
Motorola, "Feedback Comparison in Supporting LTE-A MU-MIMO and CoMP Operations," 3GPP TSG RAN1#57bis, R1-092635, Jun. 29-Jul. 3, 2009, pp. 1-5, Los Angeles, CA.
Oteri, O., et al., "Multicell Optimization for Diversity and Interference Mitigation," IEEE Transactions on Signal Processing, vol. 56, No. 5, May 2008, pp. 2050-2061.
Qualcomm Europe, "Signaling for spatial coordination in DL CoMP," 3GPP TSG-RAN WG1 #56, R1-090867, Feb. 9-13, 2009, pp. 1-8, Athens, Greece.
Qualcomm Europe, "CoMP Cooperative Silencing Hotzone DL Performance," 3GPP TSG-RAN WG1 #55bis, R1-090368, Jan. 12-16, 2008, pp. 1-10, Ljubljana, Slovenia.
Sadek, M., et al., "A Leakage-Based Precoding Scheme for Downlink Multi-User MIMO Channels," IEEE Transactions on Wireless Communications, vol. 6, No. 5, May 2007, pp. 1711-1721.
Samsung, "Inter-Cell Interference Mitigation Through Limited Coordination," 3GPP TSG RAN WG1 Meeting #54, R1-082886, Aug. 18-22, 2008, 8 pages, Jeju, Korea.
Texas Instruments, "Inconsistency between PMI definition and codebook index," 3GPP TSG-RAN Meeting #55, R1-084440, Nov. 10-14, 2008, 4 pages, Prague, Czech Republic.

* cited by examiner

SYSTEM AND METHOD FOR INTER-CELL INTERFERENCE COORDINATION

This is a divisional application of U.S. application Ser. No. 12/705,107, filed on Feb. 12, 2010 entitled "System and Method for Inter-Cell Interference Coordination" which claims the benefit of U.S. Provisional Application No. 61/248,524, filed on Oct. 5, 2009, entitled "Coordinated Beamforming with Limited Backhaul Support," which applications are hereby incorporated herein by reference.

TECHNICAL FIELD

The present invention relates generally to wireless communications, and more particularly to a system and method for inter-cell interference coordination (ICIC).

BACKGROUND

Typically, in a modern wireless communications system, a plurality of cells or NodeBs (NB) (also commonly referred to as base stations, base terminal stations, communications controllers, and so on) may be arranged into a cluster of cells, with each cell having multiple transmit antennas. Additionally, each cell or NB may be serving a number of users (also commonly referred to as User Equipment (UE), mobile stations, terminals, and so forth) based on a priority metric, such as fairness, proportional fairness, round robin, and so forth, over a period of time.

Usually, the NBs may be arranged close to each other so that a decision made by a first NB may have an impact on a second NB. For example, the NBs may use their transmit antenna arrays to form beams. This may mean that if the first NB decides to serve a first UE in a particular time-frequency slot, it may form a beam pointing to that UE. However, the pointed beam may extend into a coverage area of the second NB and cause interference to UEs served by the second NB. The inter-cell interference (ICI) for small cell wireless communications systems is commonly referred to as an interference limited cell scenario, which may be different from a noise limited cell scenario seen in large cell wireless communications systems.

The amount and type of interference that the first NB causes to UEs in the coverage area of the second NB may depend on which UE the first NB chooses to schedule in a particular time-frequency slot. Usually and until recently, each NB may independently make such scheduling decisions and let the UEs independently deal with the interference fluctuations.

In a commonly used solution, a NB may be used to apply a safety back off margin to a reported channel quality indicator (CQI) message from a UE to its serving NB. The NB may then use the backed off version of the CQI to perform link adaptation and select a modulation and coding selection (MCS) level thereon. Another commonly used solution may be for either the NB or the UE to average several measured CQIs in order to average out the CQI fluctuations. Alternatively, coordination between cells may be used to reduce the amount of interference.

SUMMARY OF THE INVENTION

These and other problems are generally solved or circumvented, and technical advantages are generally achieved, by embodiments of a system and method for inter-cell interference coordination (ICIC).

In accordance with an embodiment, a method for communications controller operation is provided. The method includes receiving interferer information from a communications device served by the communications controller, scheduling a cell edge communications device based on the received interferer information, and reporting usage information of the subset of resources to neighboring communications controllers. The cell edge communications device operates in a periphery of a coverage area of the communications controller, and the cell edge communications device is scheduled to a subset of resources reserved for the cell edge communications device. The method also includes from each neighboring communications controller, receiving neighboring usage information of a neighboring subset of resources reserved for cell edge communications devices served by the neighboring communications controller. The method further includes scheduling a cell center communications device based on the received neighboring usage information from the neighboring communications controllers, and transmitting to scheduled communications devices over their respective scheduled resources. The cell center communications device operates in close proximity to the communications controller, and wherein the cell center communications device is scheduled to resources not in the subset of resources.

In accordance with another embodiment, a method for communications controller operation is provided. The method includes receiving interferer information from a communications device served by the communications controller, computing an avoidance pattern for a subset of resources reserved for use by at least one cell edge communications device, and reporting the avoidance pattern to neighboring communications controllers. The at least one cell edge communications device operates in a periphery of a coverage area of the communications controller. The method also includes from each neighboring communications controller, receiving a neighboring avoidance pattern for a neighboring subset of resources reserved for use by cell edge communications devices of the neighboring communications controller. The method further includes scheduling the at least one cell edge communications device based on the avoidance pattern, scheduling at least one cell center communications device based on the received neighboring avoidance patterns, and transmitting to scheduled communications devices over their respective scheduled resources. The at least one cell center communications device operates in close proximity to the communications controller relative to the at least one cell edge communications device.

In accordance with another embodiment, a communications controller is provided. The communications controller includes a scheduler, a beamforming unit coupled to the scheduler, a single user unit coupled to the scheduler and to the beamforming unit, and a multi-user unit coupled to the scheduler and to the beamforming unit. The scheduler selects at least one communications device for transmission in a transmission opportunity. The at least one communications device is selected based on available network resources and interference information provided by communications devices served by the communications controller. The beamforming unit maps information for the at least one communications device onto a beamforming vector for transmission, the single user unit provides single user beamforming vectors to the beamforming unit, and the multi-user unit provides multi-user beamforming vectors to the beamforming unit. The single user beamforming vectors are generated by the single user unit based on the at least one communications device and the channel estimate, and the multi-user beamforming vectors are generated by the multi-user unit based on the at least one communications device and the channel estimate.

An advantage of an embodiment is that a causality problem associated with a wide range of coordination techniques may be eliminated.

A further advantage of an embodiment is that a high data rate, low latency backhaul link between NBs may be eliminated, thereby reducing wireless communications system implementation costs.

Yet another advantage of an embodiment is that the format of the information exchanged between the NBs may be independent of a degree of coordination between the NBs, thereby reducing the load on the NBs when an amount of coordination between the NBs changes.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution (LTE) compliant wireless communications system. The invention may also be applied, however, to other wireless communications systems, such as, 3GPP LTE-Advanced, wherein coordination between NBs may be allowed to reduce inter-cell interference.

Figure 1:
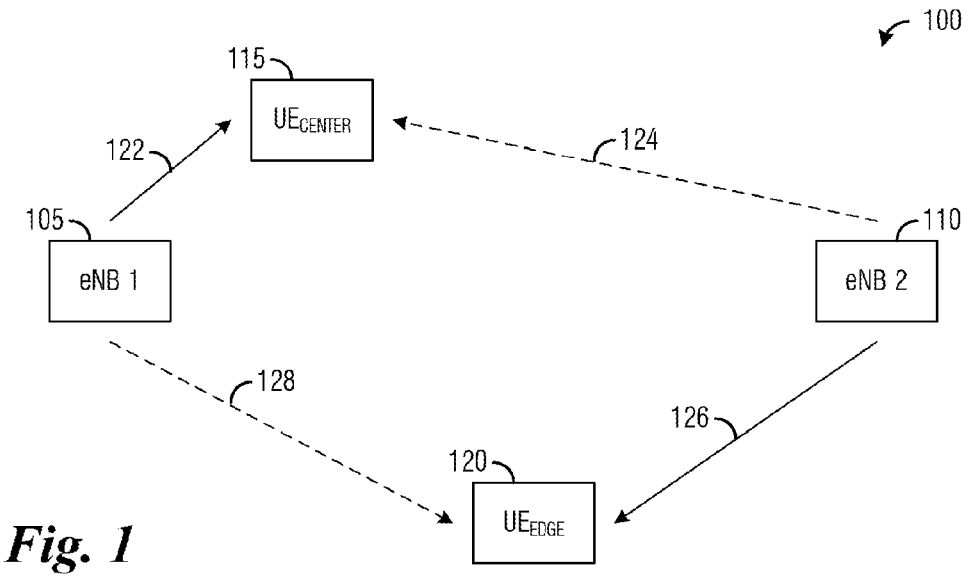
FIG. 1 is a diagram of a wireless communications system.

FIG. 1 illustrates a wireless communications system 100. Wireless communications system 100 includes a first Enhanced NodeB (eNB) 105 and a second eNB 110. First eNB 105 and second eNB 110 may serve a number of user equipments (UEs). For example, first eNB 105 may serve a first UE 115, while second eNB 110 may serve a second UE 120.

First UE 115 may receive transmissions from first eNB 105 (shown as channel 122) as well as interference from second eNB 110 (shown as channel 124). Similarly, second UE 120 may receive transmissions from second eNB 110 (shown as channel 126) as well as interference from first eNB 105 (shown as channel 128).

First UE 115 may be located close to first eNB 105 relative to a total coverage area of first eNB 105 (herein referred to as a cell center UE) and therefore may experience less interference while observing no dominant interfering cells. Cell center UEs, such as first UE 115, may benefit mainly from multi-user multiple input, multiple output (MU-MIMO) operation and higher rank single-user multiple input, multiple output (SU-MIMO) operation while obtaining little benefit from coordination. Second UE 120 may be located far from second eNB 110 relative to a total coverage area of second eNB 110 (herein referred to as a cell edge UE) and therefore may have its performance limited by interference and may observe one or two dominant interfering cells. Cell edge UEs, such as second UE 120, may benefit mainly from coordination while obtaining little benefit from MU-MIMO operation or higher rank SU-MIMO operation.

In general, there may be two distinct techniques that may be used to mitigate inter-cell interference (ICI). A first technique makes use of power domain techniques to mitigate ICI. An example of power domain inter-cell interference coordination (ICIC) is fractional frequency reuse (FFR). In FFR, transmissions to cell edge UEs of a cell may be restricted to defined time-frequency resources. Furthermore, restricted time-frequency resources of neighboring cells may be ordered to minimize overlap. To limit the amount of interference, transmission power of transmissions made in the restricted time-frequency resources may be boosted, while the transmission power of a remainder of the time-frequency resources may be reduced. This may limit the amount of interference seen by cell edge UEs and increase cell edge UE performance.

For example, in a communications system with two eNBs, such as shown in FIG. 1, a first eNB (such as first eNB 105) may schedule its cell edge UEs using the restricted time-frequency resources associated for its cell without considering coordination. The first eNB may use simple beamforming to maximize a signal plus interference to noise ratio (SINR). A second eNB (such as second eNB 110) may schedule its cell center UEs using the restricted time-frequency resources using knowledge of the first eNB's scheduling of transmissions on the restricted time-frequency resources. A goal of a scheduler for the second eNB may be to maximize a throughput of the second eNB while avoiding causing interference with the first eNB's cell edge UEs.

A second technique makes use of spatial domain techniques to mitigate ICI. An example of spatial domain ICIC is coordinated beam forming/scheduling (CBF/CS). In CBF/CS, the UEs served by an eNB may be scheduled or beam-formed based on scheduling decisions of other cells. There may be three distinct classes of CBF/CS:

Coordinated beam switching (CBS)—A scheduler in each eNB may cycle through a grid of beams in a deterministic way. The UE may then signal a desired combination of serving cell and interference cell beams implicitly by sending CQI feedback corresponding to a specific time slot in a cycle period of a serving cell;

Coordinated scheduling—A precoder design is independent of scheduler. The precoder is a fixed design, e.g., a maximum eigenvector of the channels, and the UEs may be conditionally scheduled in subsequently scheduled cells based on UE/precoder selection in previously scheduled cells.

Coordinated beam forming—The precoder design and the scheduler are inter-dependent. Each eNB knows the UEs scheduled to transmit in a coordinating set. The precoders are then designed based on interference offered to or from the scheduled UEs.

It may be possible to combine both spatial and power domain ICIC into a single combined ICIC technique that may be able to exploit advantages of each technique. For example, combining both spatial and power domain ICIC techniques into a single combined ICIC technique may be able to help eliminate a non-causality problem, wherein a scheduler's scheduling decisions may be based upon the scheduling decisions of its interfering cells (neighboring cells), which in turn, may be based on the scheduler's own scheduling decisions.

Figure 2A:
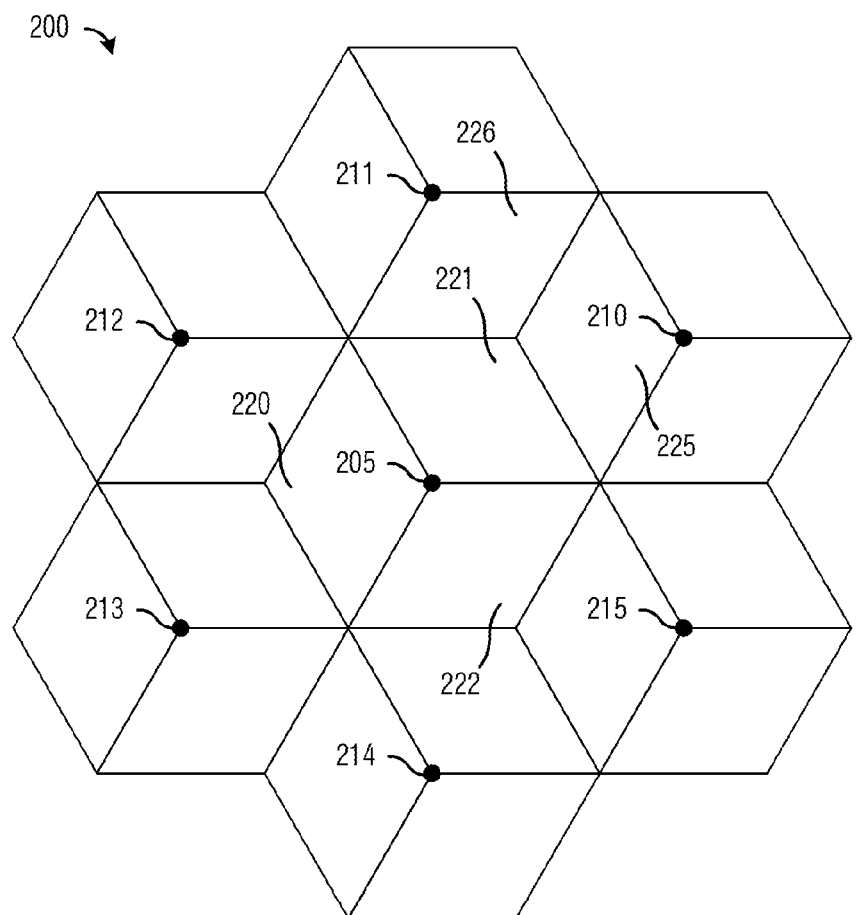
FIG. 2a is a diagram of a cluster of eNBs.
Figure 2B:
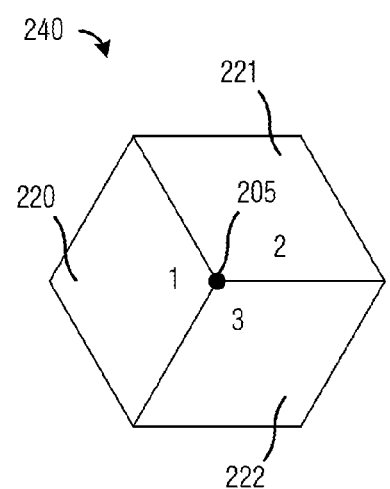
FIG. 2b is a detailed view of a coverage area of an eNB.

FIG. 2a illustrates a cluster of eNBs 200. Cluster of eNBs 200 includes seven eNBs, such as eNB 205, surrounded by six neighboring eNBs (eNBs 210 through 215). The eNBs in cluster of eNBs 200 may be configured in a three-sector configuration. In a three-sector configuration, an eNB's coverage area may be partitioned into three sectors. For example, coverage area of eNB 205 may include sectors 220 through 222. FIG. 2b illustrates a detailed view of a coverage area 240 of eNB 205. Sectors of an eNB may be assigned a name or number. Sectors of eNB 205 may be referred to as sector one (sector 220), sector two (sector 221), and sector three (sector 222), for example. Although FIGS. 2a and 2b illustrate a three-sector configuration, other eNB sector configurations may be possible.

Returning now to FIG. 2a, in general, for a UE operating in a sector of an eNB's coverage area, such as sector 221 (sector two) of eNB 205, interference may predominately arise from transmissions occurring in the other sectors of the same eNB or sectors of neighboring eNBs immediately adjacent to the sector containing the UE, for example, with sector 221 of eNB 205 dominant interference may come from sector 220 and 222 of eNB 205 as well as sector 225 of eNB 210 and sector 226 of eNB 211. While transmissions from other sectors of other neighboring (and potentially non-neighboring) eNBs may cause interference, generally, interference from these transmissions may not be dominant interferers.

Figure 3A:
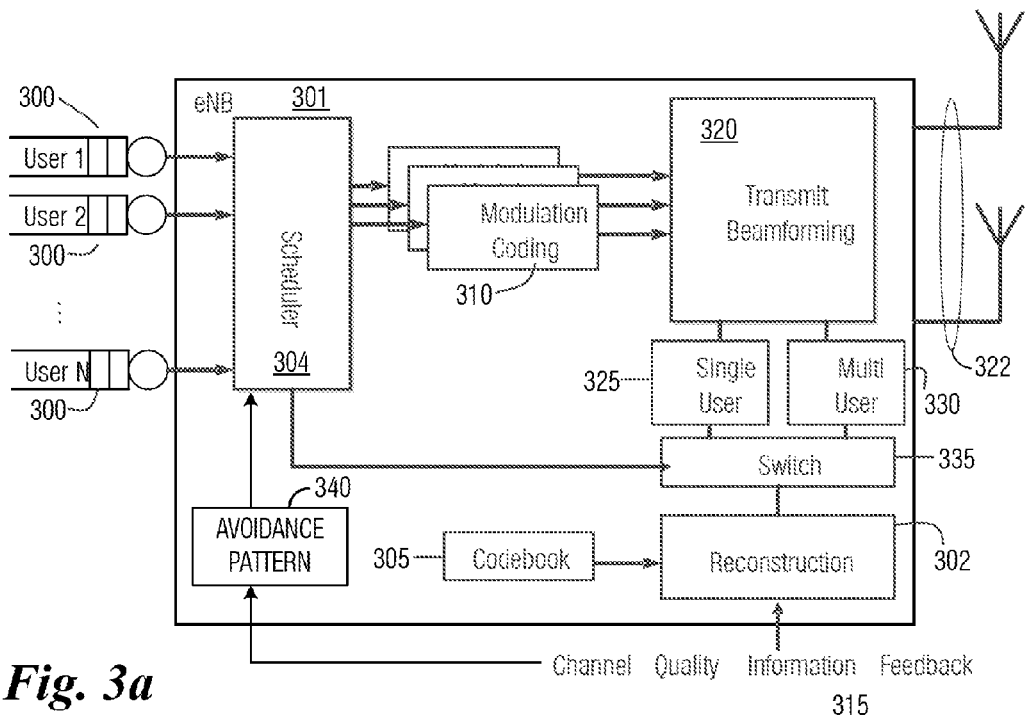
FIG. 3a is a diagram of an eNB.

FIG. 3a illustrates an eNB 301. Data 300, in the form of bits, symbols, or packets, for example, destined for a plurality of UEs being served are sent to a scheduler 304, which decides which UEs will be transmitted to in a given time/frequency opportunity. Data for the UEs selected for transmission are processed by modulation and coding block 310 to convert to transmitted symbols and add redundancy for the purpose of assisting with error correction or error detection. The modulation and coding scheme is chosen based in part on information contained in channel quality information feedback 315.

The output of modulation and coding block 310 is passed to a transmit beamforming block 320, which maps the modulated and coded stream for each UE onto a beamforming vector. The beamformed outputs are coupled to antennas 322 through RF circuitry. The transmit beamforming vectors are input from single user (UE) block 325 or multi-user (UEs) block 330. Either beamforming for a single user (UE) or multi-user (UEs) beamforming may be employed, as determined by switch 335, based on information from scheduler 304 and channel quality information feedback 315. Part of each UE's channel quality information feedback includes a new feedback message that provides indices corresponding to quantized channel information as described in the embodiments.

Reconstruction block 302 uses the indices in channel quality information feedback 315 combined with a codebook 305, for example, to reconstruct a high-resolution estimate of the quantized channel state information (CSI). The output of reconstruction block 302 is passed to switch 335 that forwards the information to either the single user (UE) block 325 or the multi-user (UEs) block 330. Other information may also be passed to these blocks, for example a SINR estimate may be passed to the multi-user (UEs) block 330 to improve its performance. Single user (UE) block 325 uses the output of reconstruction block 302 as the beamforming vector for the selected user (UE).

Multi-user (UEs) block 330 combines the codeword and other information from multiple users (UEs) to derive the transmit beamforming vectors employed for each UE. It may use any number of algorithms known in the literature including zero forcing, coordinated beamforming, minimum mean squared error beamforming, or lattice reduction aided precoding, for example.

Scheduler 304 may use any of the known scheduling disciplines in the literature including round robin, maximum sum rate, proportional fair, minimum remaining processing time, or maximum weighted sum rate; generally scheduling decisions are based on channel quality information feedback 315 received from the plurality of UEs. Scheduler 304 may decide to send information to a single MS via transmit beamforming or may decide to serve multiple UEs simultaneously through multi-user MIMO communication.

Scheduler 304 schedules UEs based on a position of the UE, for example, cell center UE or cell edge UE. Furthermore, depending on the position of the UE, time-frequency resources available for scheduling may differ. For example, scheduler 304 may only schedule cell edge UEs to the restricted time-frequency resources, while cell center UEs may not be scheduled to the restricted time-frequency resources.

An avoidance pattern unit 340 may use channel quality feedback information 315 provided by its UEs and the scheduling and traffic information provided by scheduler 304 to generate an avoidance pattern, which it may provide to scheduler 304. Scheduler 304 may schedule cell edge UEs based on the avoidance pattern provided by avoidance pattern unit 340. The avoidance pattern may also be provided by eNB 301 to neighboring eNBs that may use the avoidance pattern to schedule their own cell center UEs. Furthermore, eNB 301 may receive avoidance patterns from its neighboring eNBs and make use of the received avoidance patterns to schedule its cell center UEs. A detailed description of the use of avoidance patterns to schedule cell center UEs is provided below.

Modulation and coding block 310 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment is made based on channel quality information feedback 315 in a preferred embodiment and may be determined jointly in scheduler 304.

While not explicitly illustrated, it is obvious to those of ordinary skill in the art that OFDM modulation can be used. Further, any number of multiple access techniques could be used including orthogonal frequency division multiple access, code division multiple access, frequency division multiple access, or time division multiple access. The multiple access technique may be combined with the modulation and coding block 310 or the transmit beamforming block 320 among others.

Channel quality information feedback 315 may, for purposes of illustration, be in the form of quantized channel measurements, modulation, coding, and/or spatial formatting decisions, received signal strength, and signal-to-interference-plus-noise measurements.

Figure 3B:
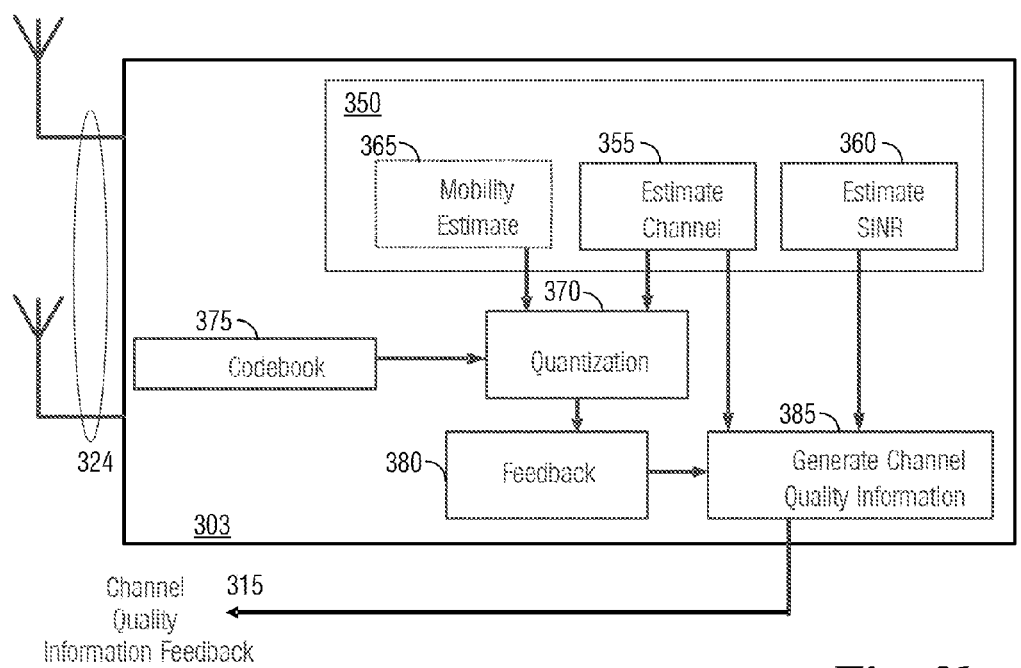
FIG. 3b is a diagram of a UE.

FIG. 3b illustrates a UE 303. UE 303 may have one or more receive antennas 324, connecting through RF circuitry to a receiver signal processing block 350. Some of the key functions performed by receiver signal processing block 350 include channel estimation block 355, estimate SINR block 360, and a mobility estimate block 365.

Channel state information is quantized using a quantization block 370 as described in the embodiments. Quantization block 370 quantizes the received signal using a codebook 375. An index from codebook 375 may be output from quantization block 370. In another embodiment, un-quantized channel state information may be reported. An estimate of the amount of channel variation, produced by mobility estimate block 365, may be used to improve the quantization algorithm by initializing the algorithm from a previous quantization level or adjusting the amount of localization.

Feedback block 380 generates a new feedback message by combining the codebook indices output from quantization block 370. Generate channel quality information block 385 generates a special feedback control message employing the outputs of feedback block 380 to produce channel quality information feedback 315.

Channel estimation block 355 may employ any number algorithms known in the art including least squares, maximum likelihood, maximum a postiori, Bayes estimator, adaptive estimator, or a blind estimator. Some algorithms exploit known information inserted into the transmit signal in the form of training signals, training pilots, while others use structure in the transmitted signal such as cyclostationarity to estimate coefficients of the channel between the eNB and the UE.

Estimate SINR block 360 outputs some measure of performance corresponding to the desired signal. In one embodiment this consists of a received signal power to interference plus noise estimate. In another embodiment, it provides an estimate of the received signal-to-noise ratio. In yet another embodiment, it provides an estimate of the average received signal power, averaged over subcarriers in an OFDM system.

Figure 4:
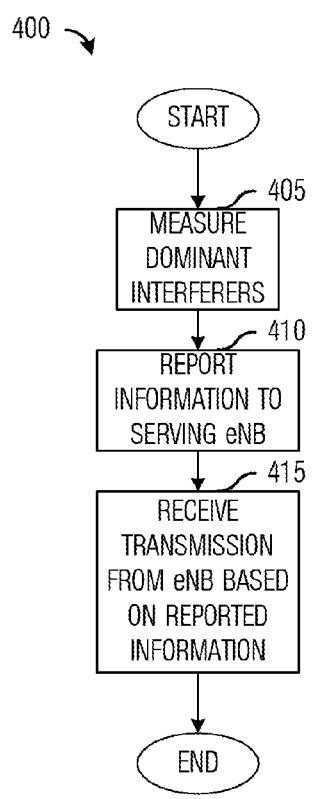
FIG. 4 is a flow diagram of UE operations in receiving a transmission from its serving eNB.

FIG. 4 illustrates a flow diagram of UE operations 400 in receiving a transmission from its serving eNB. UE operations 400 may be indicative of operations occurring in a UE operating within a coverage area of an eNB. For example, the UE may be a cell center UE, such as first UE 115 (FIG. 1), or a cell edge UE, such as second UE 120 (FIG. 1). UE operations 400 may occur while the UE is in a normal operating mode and may continue as long as the UE remains within the coverage area of the eNB.

UE operations 400 may begin with the UE measuring received interference from neighboring eNBs (block 405). The UE may measure interference information from all sources (e.g., all of its neighboring eNBs). The UE may report an identity of the interferers (referred to as set A) as well as measured CSI for each of the interferers. The interferers in set A may be UE specific, meaning that different UEs may report different interferers, different measured CSI, or both. For example, two UEs operating within a sector of the same serving eNB may report the same interferers, but may report different measured CSI depending on their relative positions within the sector.

However, instead of reporting all measured interference information, which may consume considerable feedback resources, the UE may report measured interference information for dominant interferers. For example, referring to cluster of eNBs 200 shown in FIG. 2a, it may be expected that for a given UE, there may be two dominant interferers, which may be transmissions occurring in sectors immediately adjacent to the UE. However, the UE may be able to detect interference from more than two interferers. The UE may deem that an interferer is a dominant interferer if its measured interference exceeds a specified threshold, for example. Additionally, the UE may adjust the threshold based on a measured strength of transmissions made by the serving eNB.

According to an embodiment, the UE may arbitrarily select a number of interferers as dominant interferers. Alternatively, the number of interferers that the UE selects as dominant interferers may be specified by the communications system, operator of the communications system, standard specification, or so forth. The number of interferers may be based on factors such as available feedback bandwidth, number of UEs operating in the communications system, communications system load, desired performance, and so forth.

The UE may then report the interferers and associated CSI to the serving eNB (block 410). The UE may regularly report the interferers and associated CSI to the serving eNB with the period of the reporting being specified by the serving eNB, communications system, operator of the communications system, technical specification, or so on. Alternatively, the UE may report the interferers and associated CSI to the serving eNB upon receipt of an instruction to do so from the serving eNB. For example, if the serving eNB detects a drop in performance, an increase in errors, an inability to meet quality of service requirements, or so forth, the serving eNB may instruct the UEs that it is serving to perform and report interferer information.

In addition to the interferers and associated CSI, the UE may also measure a communications channel between itself and the serving eNB. The UE may also report CSI and/or other communications channel information to the serving eNB along with the interferers and associated CSI.

Based on the reported interferers and associated CSI transmitted to the serving eNB, the UE may then receive a transmission from the serving eNB (block 415). The transmission from the serving eNB may make use of the reported interferers and associated CSI information provided by the UE. UE operations 400 may then terminate.

Figure 5:
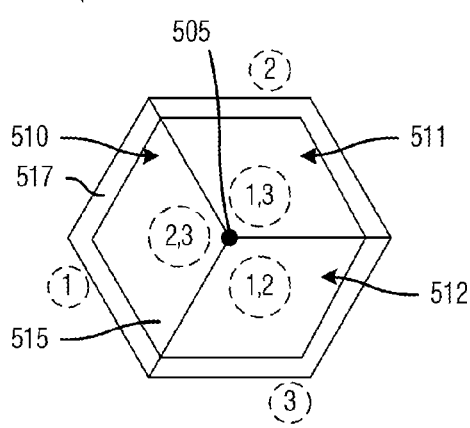
FIG. 5 is a time-frequency resource allocation map for an eNB.

FIG. 5 illustrates a time-frequency resource allocation map 500 for an eNB. Time-frequency resource allocation map 500 for an eNB, such as eNB 505, may be used in conjunction with a combined ICIC technique. As shown in FIG. 5, time-frequency resource allocation map 500 for eNB 505 is arranged in a three-sector configuration. Other time-frequency resource allocation maps may be possible for eNBs arranged in different sector configurations.

A coverage area of eNB 505 may be partitioned into three sectors, sectors 510 through 512. Additionally, available time-frequency resources may be partitioned into three sets, numbered one, two, and three respectively. The three sets may be about equal in size or they may be different sizes. Each sector may also be partitioned based on a relative distance from eNB 505. A sector may be conceptually partitioned into a cell center partition and a cell edge partition. For example, sector 510 may be partitioned into cell center partition 515 and cell edge partition 517. In a communications system, the actual coverage area as well as the cell center and cell edge areas of a cell are usually irregular and depend on many aspects of the communication environments.

One or more of the sets of time-frequency resources may be assigned for exclusive use for cell edge UEs of a sector and the remainder of the time-frequency resources may be assigned for exclusive use for cell center UEs of the sector. For example, for sector 510, time-frequency resource set one may be assigned for exclusive use for UEs in cell edge partition 517, while time-frequency resource sets two and three may be assigned for exclusive use for UEs in cell center partition 515. Similar assignments may be made in the other two sectors of eNB 505. As shown in FIG. 5, time-frequency resource set two may be assigned for exclusive use for UEs in cell edge partition of sector 511 and time-frequency resource sets one and three may be assigned for exclusive use for UEs in the cell center partition, while time-frequency resource set three may be assigned for exclusive use for UEs in cell edge partition of sector 512 and time-frequency resource sets one and two may be assigned for exclusive use for UEs in the cell center partition. In another embodiment, one or more of the sets of time-frequency resources may be assigned for cell edge UEs of a sector with high priority and the remainder of the time-frequency resources may be assigned for cell center UEs of the sector with high priority.

The above time-frequency resource set assignment may be described generally for an eNB with X sectors numbered consecutively (e.g., X=three sectors, numbered as one, two and three, respectively) according to a steering direction. Based on the sector topology, sectors of neighboring eNBs labeled with the same number will not be adjacent to each other, ensuring that cell edge interference is limited. The available time-frequency resources may be divided into X (e.g., three) subbands (sets) with one set preferred or restricted for the cell edge UEs in each sector. For identically numbered sectors, the set location is identical, implying that cell edge UEs from neighboring eNBs have their sets non-overlapping or staggered.

Figures 6, 7A, 7B:
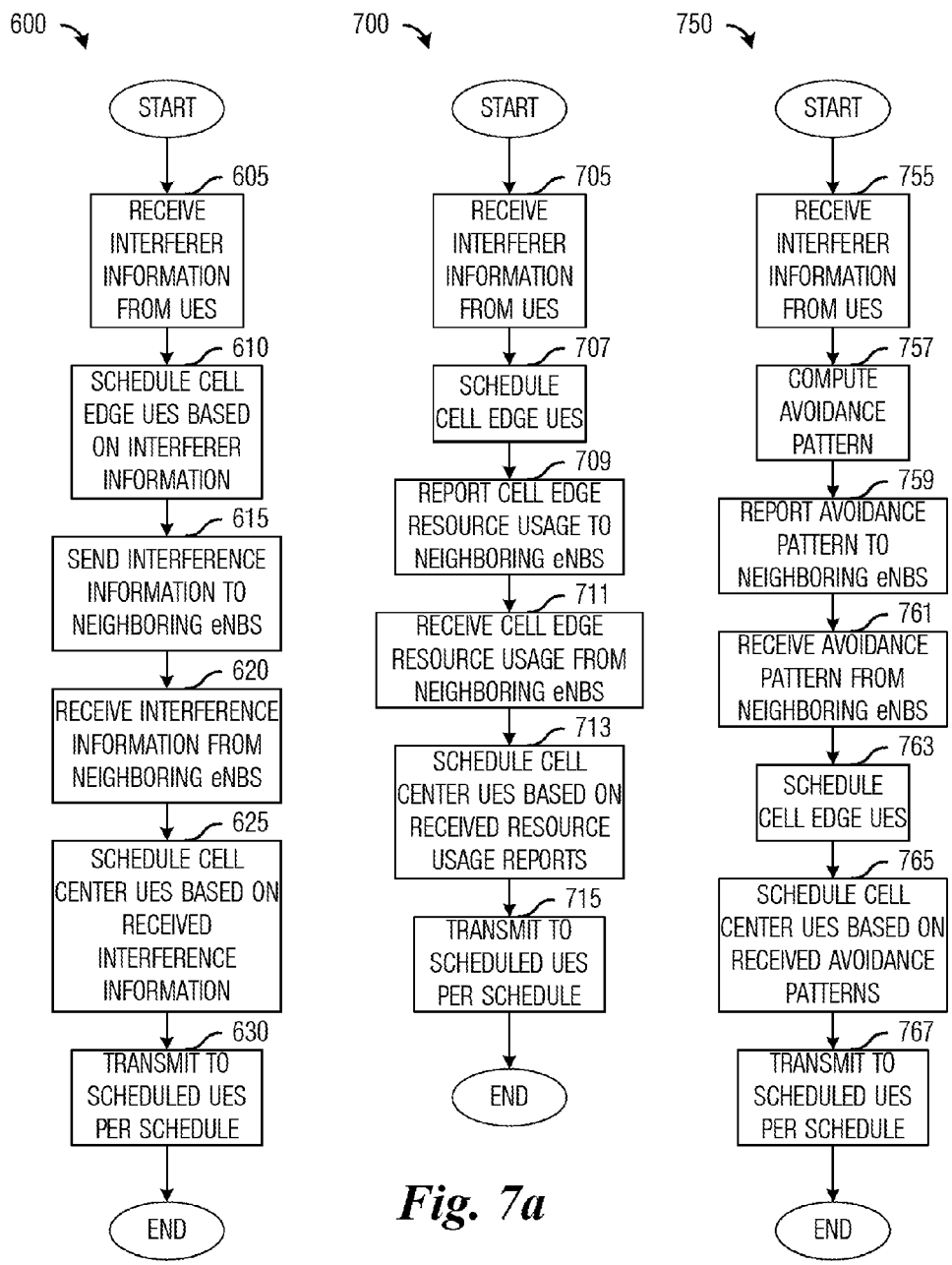
FIG. 6 is a flow diagram of eNB operations in mitigating ICI using a combined spatial and power domain technique.
FIG. 7a is a flow diagram of eNB operations in mitigating ICI using a combined spatial and power domain technique without the use of an avoidance pattern.
FIG. 7b is a flow diagram of eNB operations in mitigating ICI using a combined spatial and power domain technique with the use of an avoidance pattern.

FIG. 6 illustrates a flow diagram of eNB operations 600 in mitigating ICI using a combined spatial and power domain technique. eNB operations 600 may be indicative of operations taking place in an eNB that is serving UEs, with the UEs potentially being cell center UEs, cell edge UEs, or both. eNB operations 600 may occur while the eNB is in a normal operating mode and may continue for as long as the eNB remains in the normal operating mode.

eNB operations 600 may begin with the eNB receiving interferer information from the UEs that it is serving (block 605). As discussed previously, the UEs may each provide to the eNB information related to a specified number of dominant interferers, the information includes CSI related to the dominant interferers. By providing information related to only the dominant interferers, a reduction in a total amount of interferer information may be achieved.

The eNB may then use the interferer information to schedule its cell edge UEs (block 610). Cell edge UEs may be UEs of the eNB that are operating near a periphery of a coverage area of the eNB and may therefore be susceptible to interference from neighboring eNBs. According to a preferred embodiment, the eNB may schedule the cell edge UEs to a portion of a total available time-frequency resources specifically reserved for cell edge UEs. To help reduce time-frequency resource overlap, different sectors of the eNB may use a different portion of the total available time-frequency resources to schedule cell edge UEs. The eNB may schedule as many cell edge UEs as there are available time-frequency resources or transmissions to be made. Refer to FIG. 5 for one possible time-frequency resource allocation for eNBs configured in a three-sector arrangement.

Furthermore, the interferer information reported by the UEs may be used to compute an avoidance pattern. The avoidance pattern may be a map of time-frequency resource usage over time and may be used by the scheduler to schedule UEs. Additionally, the avoidance pattern may be provided to other eNBs (e.g., neighboring eNBs) so that they can schedule their UEs to reduce interference to the cell-edge UEs of the current eNB. A detailed description of the computing and using of the avoidance pattern is provided below.

After scheduling cell edge UEs, the eNB may provide interference information to other eNBs (e.g., neighboring eNBs) (block 615). The interference information provided to other eNBs may be based on the scheduled cell edge UEs and may include time-frequency resources allocated to the cell edge UEs. According to an embodiment, a relevance (or usefulness) of the interference information provided to a particular neighboring eNB may be dependent on a relative position of the neighboring eNB to the eNB. For example, the interference information provided to a neighboring eNB only contains information related to transmissions that may have an impact on transmissions occurring in the neighboring eNB.

In addition to sending interference information to neighboring eNBs, the eNB may also receive interference information from its neighboring eNBs (block 620). The interference information received from each of the neighboring eNBs may also be based on interferer information received by the neighboring eNBs. Furthermore, the interference information may also be based on cell edge UEs scheduled by the neighboring eNBs. As an example, the received interference information may be in the form of avoidance patterns from the neighboring eNBs.

The eNB may schedule its cell center UEs based on the received interference information (block 625). According to an embodiment, for a particular cell center UE to be scheduled, the eNB may make use of received interference information from neighboring eNBs so that the amount of interference generated to the UEs of neighboring cells may be reduced. By using only received interference information from neighboring eNBs noted as dominant interferers by a cell center UE being scheduled, an amount of interference information that needs to be considered when making scheduling decisions may be reduced without sacrificing performance. The eNB may schedule as many cell center UEs as there are available time-frequency resources or transmissions to be made.

Transmissions to the scheduled UEs (both cell center UEs and cell edge UEs) may then occur as scheduled (block 630) and eNB operations 600 may then terminate.

In addition to spatial domain scheduling, transmission power of transmissions to UEs may also be controlled to reduce the effects of inter-cell interference. For example, in FFR, the interference caused by transmissions to cell center UEs may be limited by reducing the transmission power, i.e., downlink power control across frequency. It may be possible to limit the amount of interference by using spatial interference avoidance. Spatial interference avoidance may be combined with downlink power control to further reduce the level of interference caused by transmissions to cell edge UEs as well as increasing cell edge throughput.

FIG. 7a illustrates a flow diagram of eNB operations 700 in mitigating ICI using a combined spatial and power domain technique without the use of an avoidance pattern. Mitigating ICI using a combined spatial and power domain technique may be effective without the use of an avoidance pattern. Instead of an avoidance pattern, information regarding scheduled cell edge UEs may be exchanged between neighboring eNBs and may be used to schedule cell center UEs. eNB operations 700 may be indicative of operations taking place in an eNB that is serving UEs, with the UEs potentially being cell center UEs, cell edge UEs, or both. eNB operations 700 may occur while the eNB is in a normal operating mode and may continue for as long as the eNB remains in the normal operating mode. eNB operations 700 may be an embodiment of eNB operations 600.

eNB operations 700 may begin with the eNB receiving interferer information from the UEs that it is serving (block 705). As discussed previously, the UEs may each provide to the eNB information related to a specified number of dominant interferers, the information includes CSI related to the dominant interferers.

The eNB may then schedule its cell edge UEs (block 707). The eNB may schedule as many cell edge UEs as possible dependent on available time-frequency resources, presence of interferers, available transmissions, and so forth.

The eNB may report cell edge UE time-frequency resource usage information to its neighboring eNBs (block 709). The time-frequency resource usage information may include interference information regarding the scheduled cell edge UEs. The neighboring eNBs may make use of the cell edge UE time-frequency resource usage information provided by the eNB in the scheduling of their cell center UEs, which may utilize some of the same time-frequency resources. In addition to reporting its own cell edge UE time-frequency resource usage to neighboring eNBs, the eNB may receive from its neighboring eNBs their own cell edge UE time-frequency resource usage information (block 711).

The eNB may use the received cell edge UE time-frequency resource usage information from its neighboring eNBs to schedule its cell center UEs (block 713). The eNB may combine received cell edge UE time-frequency resource usage information from the neighboring eNBs prior to scheduling the cell center UEs.

According to an embodiment, a relevance of the received cell edge UE time-frequency resource usage information from a neighboring eNB to a given cell center UE may be dependent on a proximity of the cell edge UE of the neighboring eNB to the current eNB. For example, if the cell edge UE of the neighboring eNB is close to the current eNB, then the relevance of the received cell edge UE time-frequency resource usage information may be greater than the relevance of the received cell edge UE time-frequency resource usage information from a neighboring eNB of its cell-edge UEs which are far away from the current cell.

Therefore, according to an embodiment, the eNB may make use of received cell edge UE time-frequency resource usage information only from neighboring eNBs that the current eNB is indicated as being a dominant interferer. The consideration of only received cell edge UE time-frequency resource usage information from neighboring eNBs indicated as dominant interferers may help to reduce scheduling decision complexity.

The scheduling of the cell center UEs may include adjusting a precoding of the cell center UEs to reduce interference caused to the cell edge UEs, adjusting a transmit power of the cell center UEs to reduce interference caused to the cell edge UEs, or a combination of both.

Transmissions to the scheduled UEs (both cell center UEs and cell edge UEs) may then occur as scheduled (block 715) and eNB operations 700 may then terminate.

FIG. 7b illustrates a flow diagram of eNB operations 750 in mitigating ICI using a combined spatial and power domain technique with the use of an avoidance pattern. The use of an avoidance pattern, i.e., a map of time-frequency resources that may be available/unavailable for use over time, may be helpful in reducing an amount of information that may need to be exchanged between neighboring eNBs, thereby reducing data-rate/latency requirements for a backhaul link connecting the neighboring eNBs. The amount of information contained within an avoidance pattern, e.g., an amount of time spanned by the avoidance pattern, resolution of the map of time-frequency resources, layer information, and so forth, may be a function of available backhaul and latency bandwidth, desired performance, desired accuracy of the avoidance pattern, available computational resources at an eNB to compute the avoidance pattern, and so on.

eNB operations 750 may be indicative of operations taking place in an eNB that is serving UEs, with the UEs potentially being cell center UEs, cell edge UEs, or both. eNB operations 750 may occur while the eNB is in a normal operating mode and may continue for as long as the eNB remains in the normal operating mode. eNB operations 750 may be an embodiment of eNB operations 600.

eNB operations 750 may begin with the eNB receiving interferer information from the UEs that it is serving (block 755). As discussed previously, the UEs may each provide to the eNB information related to a specified number of dominant interferers, the information includes CSI related to the dominant interferers.

The eNB may then compute an avoidance pattern based on the received interferer information from its UEs (block 757). The received interferer information may allow the eNB to compute the avoidance pattern. The eNB may also update the avoidance pattern based on the received interferer information, a scheduling/allocation history for the time-frequency resources, traffic load and patterns for various cells of the eNB, backhaul properties, scheduling decisions, traffic information, and so forth. It may be possible to utilize the information listed above to update the avoidance pattern in a wide range of combinations.

For example, extreme combinations of the information may correspond to a backhaul with unlimited data transfer rate/zero latency or no backhaul at all. With a backhaul with unlimited data transfer rate/zero latency, a portion of time-frequency resources reserved for cell edge UE exclusive usage may be eliminated and all UE scheduling may be conditional in nature, based on scheduling decisions made by neighboring eNBs. An iterative scheduling technique may be performed, leading to a purely coordinated beamforming technique and cell center UEs may be served at a maximum transmit power. With no backhaul at all, a portion of time-frequency resources are reserved for cell edge UEs exclusive usage and scheduling of cell edge UEs may occur independently, while cell center UEs may be served at lower transmit power levels. For combinations of information that fall in between, a combination of the techniques for the two extreme combinations may be used, with an avoidance pattern being exchanged between neighboring eNBs to facilitate time-frequency resource usage and availability information.

In a communications system with a fast backhaul (high data transfer rate/low latency), the avoidance pattern may be generated after each subframe is scheduled and then forwarded to the neighboring eNBs. The avoidance pattern may be defined for each unit of the time-frequency resources within a reserved portion of the time-frequency resources, which may be directly derived from a CSI between the scheduled UEs and interfering eNBs. Although coordinated beamforming may be implemented using a fast backhaul, a combination of fractional frequency reuse and coordinated beamforming may avoid non-causality issues that may require the use of iterative scheduling.

In a communications system with a slow backhaul, the avoidance pattern may be updated less frequently than once per subframe. For example, with a backhaul with an average delay of 10 ms, it may then be feasible to update the avoidance pattern once every 20 ms and the avoidance pattern may be used in interfering cells for a total of approximately 20 ms assuming that a time stamp and a timer are included with the avoidance pattern.

The update period (20 ms, for example) may be a determined as a trade-off between usage of available backhaul bandwidth, avoidance pattern accuracy, computational complexity, desired performance, and so on. In general, the longer the update period, the less backhaul bandwidth required. However, avoidance pattern accuracy and communications system performance may go down, while computational complexity may increase.

Computing an avoidance pattern for a specified period of time, e.g., 20 ms, may be relatively easy in a communications system using correlated antennas, a small number of cell edge UEs, and full-buffer type transmission traffic where scheduling behavior is predictable and therefore, the transmission pattern may also be predictable. However, if conditions such as uncorrelated antennas, a large number of cell edge UEs, bursty traffic, a large number of neighboring eNBs, fast fading, and so forth, are present, then computing an avoidance pattern may be more complex. A statistical approach may be used in these conditions to determine an avoidance pattern. It may also be necessary to periodically update the avoidance pattern to ensure that good performance, fairness, quality of service, and so on, are maintained. Static or semi-static avoidance patterns may be exchanged between eNBs to facilitate static or semi-static spatial domain ICIC. Furthermore, a size of a portion of time-frequency resources, which are reserved for cell edge UEs exclusive usage may also be updated in the time, the frequency, or both domains.

For discussion purposes, assume that there are K subbands of communications system bandwidth and the avoidance pattern covers N subframes. For each subband within the K×N region, avoidance information in the avoidance pattern may include:

Size and location of restricted time-frequency resources. A total amount of the restricted time-frequency resources may vary.

The size of the restricted time-frequency resources may be determined and updated to maintain a desired fairness between cell edge UEs and cell center UEs based on a scheduling and time-frequency resource allocation history, communications system load, and so forth.

The size and location of the restricted time-frequency resources may be conveyed by a bitmap corresponding to the K×N region, e.g., a K×N bitmap, or combined with additional information.

Interfering Channel CSI. A number of layers of the CSI for each subband may be different and may vary with time.

If the number of layers is zero, then no spatial domain coordination is needed.

If the number of layers is equal to a number of transmit antennas, then muting/silencing (or lower power transmission) may be needed.

Weighting factors to indicate an important level of performing avoidance of the CSI reported for each subband. There may be a weighting factor for each layer of the CSI for each subband.

Time stamps and an effective time of the avoidance pattern. The effective time may include a time required to generate and send the avoidance pattern, a time that the avoidance pattern takes effect, as well as a period of time that the avoidance pattern is to be effective (valid).

The effective time of the avoidance pattern may be largely dependent on a delay property of the backhaul as well as channel/traffic statistics.

As an example, for a slow (low data rate) backhaul and focusing on interfering CSI and weighting factors with assumptions that one subband is restricted for use in scheduling cell edge UEs and that a group of UEs numbered one to G may be a subset of UEs that see a neighboring eNB, the avoidance pattern may be computed as:

$$M=[c_1 D_1, c_2 D_2, \ldots, c_G D_G] = U\Sigma V^H,$$

where $D_n$ is a CSI matrix between UE n and a neighboring cell, similarly $c_n$ is a factor to reflect an amount of interference caused by the neighboring eNB, $D_n$ may be an instantaneous spatial channel matrix or a channel covariance matrix or its main eigen-components, $c_n$ may be an increasing function of $$\frac{l_{n\,neighbor}}{l_{n\,serving}},$$

where $l_{n\,neighbor}$ and $l_{n\,serving}$ are pathloss between UE n and the neighboring eNB and the serving eNB, respectively.

$U\Sigma V^H$ is the single value decomposition (SVD) of M. The avoidance pattern for the subband may be the largest L singular values and the associated L columns of U, i.e., the avoidance pattern comprises the first L columns of U corresponding to the top L singular values with the largest absolute values. Other methods that may generate the interference sub-space that contains most of the interference energy may be used here.

In a situation where the group of UEs contains a single cell edge UE, the avoidance pattern may be the main eigen-components of the channel between the cell edge UE and the neighboring eNBs. The size of the restricted time-frequency resource may be updated to ensure fairness between the cell edge UE and other UEs.

In a situation where the group of UEs contains multiple cell edge UEs and multiple subbands are restricted for scheduling cell edge UEs, a key to computing the avoidance pattern may be how to group the cell edge UEs for each subband. For example, assume that two subbands are restricted for scheduling cell edge UEs and four cell edge UEs see a same strong neighboring eNB, then two cell edge UEs (with similar interference CSI) may be grouped to compute the avoidance pattern for each of the two subbands. Inputs for such grouping decisions may include a number of cell edge UEs, traffic type and/or buffer status of the cell edge UEs, scheduling history, and so forth. With a large number of cell edge UEs, a subset of the cell edge UEs may be considered for each avoidance pattern update period.

After computing the avoidance pattern, the eNB may report the avoidance pattern to its neighboring eNBs (block 759). The neighboring eNBs may make use of the avoidance pattern in the scheduling of their cell center UEs. In addition to reporting its avoidance pattern to neighboring eNBs, the eNB may receive from its neighboring eNBs their own avoidance patterns (block 761).

The eNB may then schedule its cell edge UEs to the time-frequency resource(s) reserved for scheduling cell edge UEs (block 763). The eNB may make use of its own avoidance pattern in scheduling its cell edge UEs. The eNB may also schedule its cell center UEs using the received avoidance patterns from its neighboring eNBs (block 765). The eNB may consider the avoidance patterns from multiple neighboring eNBs when scheduling its cell center UEs. The cell center UEs selected for scheduling may be based on interference avoidance per the received avoidance patterns. A precoder used may be determined by zero forcing or block diagonalization. Adjustment of channel quality indicators (CQI) may be needed.

While at the neighboring eNBs, UEs (cell edge UEs) that may benefit from the scheduling decisions of the eNB per the interference avoidance pattern may be scheduled. A precoder to be used by a neighboring eNB may be determined based on a consideration to maximize cell edge UE throughput without consideration of interference caused to other eNBs. Adjustment of CQI may be needed.

According to another embodiment, the received avoidance patterns received by the eNB from its neighboring eNBs may be combined prior to use in scheduling cell center UEs. According to an embodiment, combining avoidance patterns may involve directly combining two or more avoidance patterns. As an example, consider combining two avoidance patterns. If a time-frequency resource is marked as busy in a first avoidance pattern (indicating that it is being used in a neighboring eNB that provided the first avoidance pattern) and a corresponding time-frequency resource is marked as idle in a second avoidance pattern (indicating that it is not being used in a neighboring eNB that provided the second avoidance pattern), then in a combined avoidance pattern the time-frequency resource would be marked as busy to prevent its use. Only if a time-frequency resource is marked as being idle in both a first avoidance pattern and a second avoidance pattern would the time-frequency resource be marked as idle in the combined avoidance pattern. In another embodiment, the interference subspaces of the two avoidance patterns may be combined using SVD or any other method to calculate the interference subspace that contained most of interference energy to the victim UEs represented by the multiple received avoidance patterns.

According to an embodiment, the reporting of the avoidance pattern may occur at a lower frequency than the scheduling of the cell edge UEs and the cell center UEs.

Transmissions to the scheduled UEs (both cell center UEs and cell edge UEs) may then occur as scheduled (block 767) and eNB operations 750 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for base station operation, the method comprising:
    receiving, by a serving base station, interferer information from a user equipment (UE) served by the serving base station;
    computing, by the serving base station, a first avoidance pattern for a subset of time and frequency resources, wherein the first avoidance pattern comprises information of the subset of time and frequency resources, interfering channel state information (CSI) and a weighting factor indicating an importance level of performing avoidance of interference, the weighting factor including a weighting factor for each layer of the interfering CSI for each subband; and
    reporting, by the serving base station, the first avoidance pattern to the neighboring base station for the neighboring base station performing avoidance of interference.

2. The method of claim 1, wherein the computing of the first avoidance pattern further comprises computing the interfering CSI as:
    evaluating $M = [c_1 D_1, c_2 D_2, \ldots, c_G D_G] = U\Sigma V^H$, where $D_n$ is a channel state information (CSI) matrix between a UE n and the neighboring base station, further where $D_n$ is an instantaneous spatial channel matrix, a channel covariance matrix, or its main eigen-components, where $c_n$ is a factor to reflect an amount of interference caused by the neighboring base station, further where $c_n$ is an increasing function of $$\frac{l_{n\,neighbor}}{l_{n\,serving}},$$

where $l_{n\,neighbor}$ and $l_{n\,serving}$ are pathloss between the UE n and the neighboring base station and the serving base station, respectively, where n is a non-negative integer value, and where $U\Sigma V^H$ is a singular value decomposition (SVD) of M; and
    selecting L columns of U corresponding to L top singular values with largest absolute values as the first avoidance pattern, where L is a non-negative integer value.

3. The method of claim 1, wherein the information of the subset of time and frequency resources comprises the size and the location of the subset of resources conveyed by a K by N bitmap corresponding to K subbands of a frequency bandwidth and N subframes in time.

4. The method of claim 1, wherein the interfering CSI comprises channel state information between UE served by the serving base station and the neighboring base station.

5. The method of claim 1, wherein the interfering CSI comprises information of a number of layers of the CSI between UEs served by the serving base station and the neighboring base station.

6. The method of claim 1, wherein the first avoidance pattern further comprises a time stamp indicating when the first avoidance pattern becomes valid, or wherein the first avoidance pattern further comprises an effective time that is a duration of time during which the first avoidance pattern remains valid.

7. The method of claim 1, further comprising receiving by the serving base station a second avoidance pattern from the neighboring base station for the serving base station performing avoidance of interference.

8. The method of claim 1, wherein the information of the subset of time and frequency resources comprises the size and the location of the subset of resources that convey time-frequency resource usage and availability information.

9. A serving base station comprising:
a receiver configured to receive interferer information from a user equipment (UE) served by the serving base station;
an avoidance pattern unit configured to compute a first avoidance pattern for a subset of time and frequency resources, wherein the first avoidance pattern comprises information of the subset of time and frequency resources, interfering channel state information (CSI) and a weighting factor indicating an importance level of performing avoidance of interference, the weighting factor including a weighting factor for each layer of the interfering CSI for each subband; and
a scheduler configured to report the first avoidance pattern to the neighboring base station for the neighboring base station performing avoidance of interference.

10. The serving base station of claim 9, wherein the information of the subset of time and frequency resources comprises the size and the location of the subset of resources conveyed by a K by N bitmap corresponding to K subbands of a frequency bandwidth and N subframes in time.

11. The serving base station of claim 9, wherein the interfering CSI comprises channel state information between user equipments (UEs) served by the serving base station and the neighboring base station.

12. The serving base station of claim 9, wherein the interfering CSI comprises information of a number of layers of the CSI between UEs served by the serving base station and the neighboring base station.

13. The serving base station of claim 12, wherein the number of layers equal to zero indicates no spatial domain coordination is needed.

14. The serving base station of claim 12, wherein the number of layers equal to a number of transmit antennas indicates that reduced power transmission is needed.

15. The serving base station of claim 9, wherein the avoidance pattern unit is further configured to:
group UEs served by the serving base station into groups using interferer information; and
compute the first avoidance pattern for each group.

16. The serving base station of claim 9, wherein the avoidance pattern unit is configured to compute the interfering CSI for each group by:
evaluating $M=[c_1 D_1, c_2 D_2, \ldots, c_G D_G]=U\Sigma V^H$, where Dn is a channel state information (CSI) matrix between a UE n and the neighboring base station, further where Dn is an instantaneous spatial channel matrix, a channel covariance matrix, or its main eigen-components, where cn is a factor to reflect an amount of interference caused by the neighboring base station, further where cn is an increasing function of $$\frac{l_{n\,neighbor}}{l_{n\,serving}},$$

where ln neighbor and ln serving are pathloss between the UE n and the neighboring base station and the serving base station, respectively, where n is a non-negative integer value, and where $U\Sigma V^H$ is a singular value decomposition (SVD) of M; and
selecting L columns of U corresponding to L top singular values with largest absolute values as the first avoidance pattern, where L is a non-negative integer value.

17. The serving base station of claim 9, wherein the first avoidance pattern further comprises a time stamp that is a time when the first avoidance pattern becomes valid, or wherein the first avoidance pattern further comprises an effective time that is a duration of time during which the first avoidance pattern remains valid.

18. The serving base station of claim 9, wherein the scheduler is further configured to receive a second avoidance pattern associated with the serving base station from the neighboring base station.

19. The serving base station of claim 18, wherein the scheduler is further configured to schedule transmissions to a UE using the second avoidance pattern.

20. The serving base station of claim 9, wherein the information of the subset of time and frequency resources comprises the size and the location of the subset of resources that convey time-frequency resource usage and availability information.

* * * * *